United States Patent [19]
Minamimura et al.

[11] Patent Number: 5,492,670
[45] Date of Patent: Feb. 20, 1996

[54] INJECTION MOLDING METHOD

[75] Inventors: Masaaki Minamimura; Fumio Shiozawa, both of Nagano, Japan

[73] Assignee: Nissei Plastic Industrial Co., Ltd., Japan

[21] Appl. No.: 292,407

[22] Filed: Aug. 18, 1994

[30] Foreign Application Priority Data

Aug. 20, 1993 [JP] Japan .................................. 5-226630
Sep. 22, 1993 [JP] Japan .................................. 5-257457

[51] Int. Cl.$^6$ .................................................. B29C 45/50
[52] U.S. Cl. ...................................... 264/328.17; 425/587
[58] Field of Search ................................ 264/40.1, 40.5, 264/328.1, 328.13 328.17; 425/145, 149, 587

[56] References Cited

U.S. PATENT DOCUMENTS 4,208,176  6/1980  Salerno .................................. 425/149
5,219,512  6/1993  Tsitsumi ................................. 425/149

*Primary Examiner*—Jill J. Heitbrink
*Attorney, Agent, or Firm*—Ostrolenk, Faber, Gerb & Soffen

[57] ABSTRACT

An injection molding method characterized in that after resin charging is completed, with the screw allowed to rotate, process is shifted to the metering process, and using the back pressure in the metering process as a dwelling pressure, dwelling is performed simultaneously with the resin metering. In addition, with the back pressure required for metering set to a higher value as a primary back pressure, and using the back pressure as a dwelling pressure, dwelling is performed simultaneously with the resin metering, and after the dwelling time has elapsed, with the pressure allowed to lower so as to use as a secondary back pressure, the metering is continued to a set time. According to the above-mentioned method, as a whole, the required cycle time becomes shorter than in a conventional case where metering is started after dwelling.

5 Claims, 7 Drawing Sheets

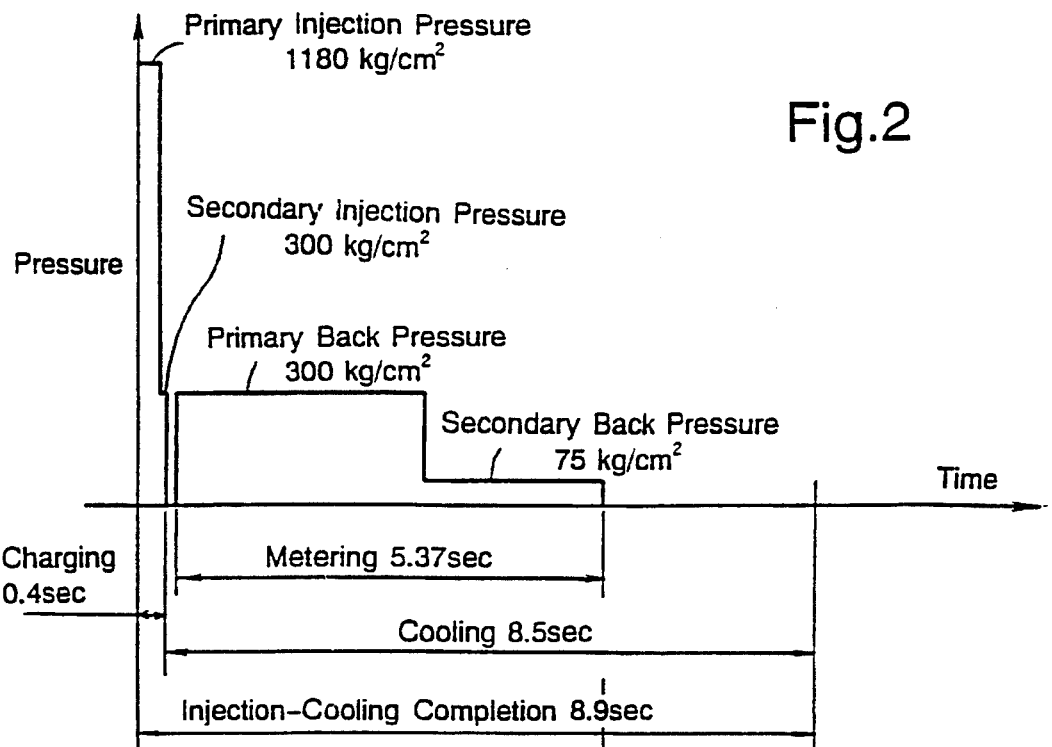
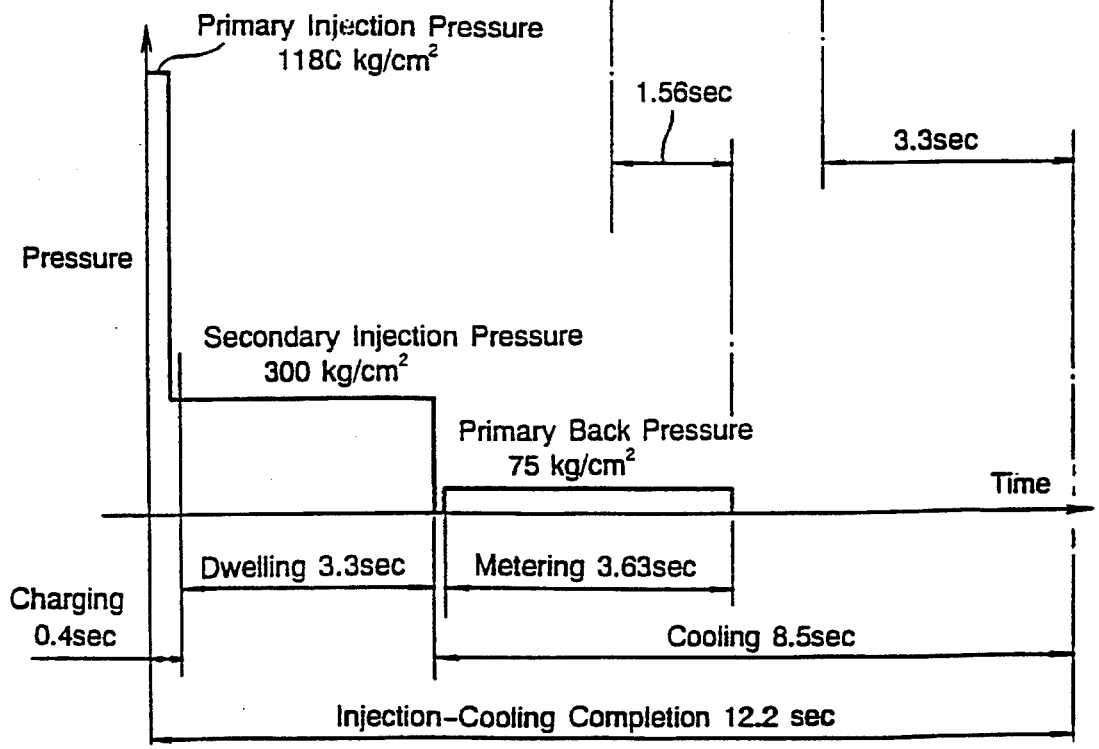
Fig.2

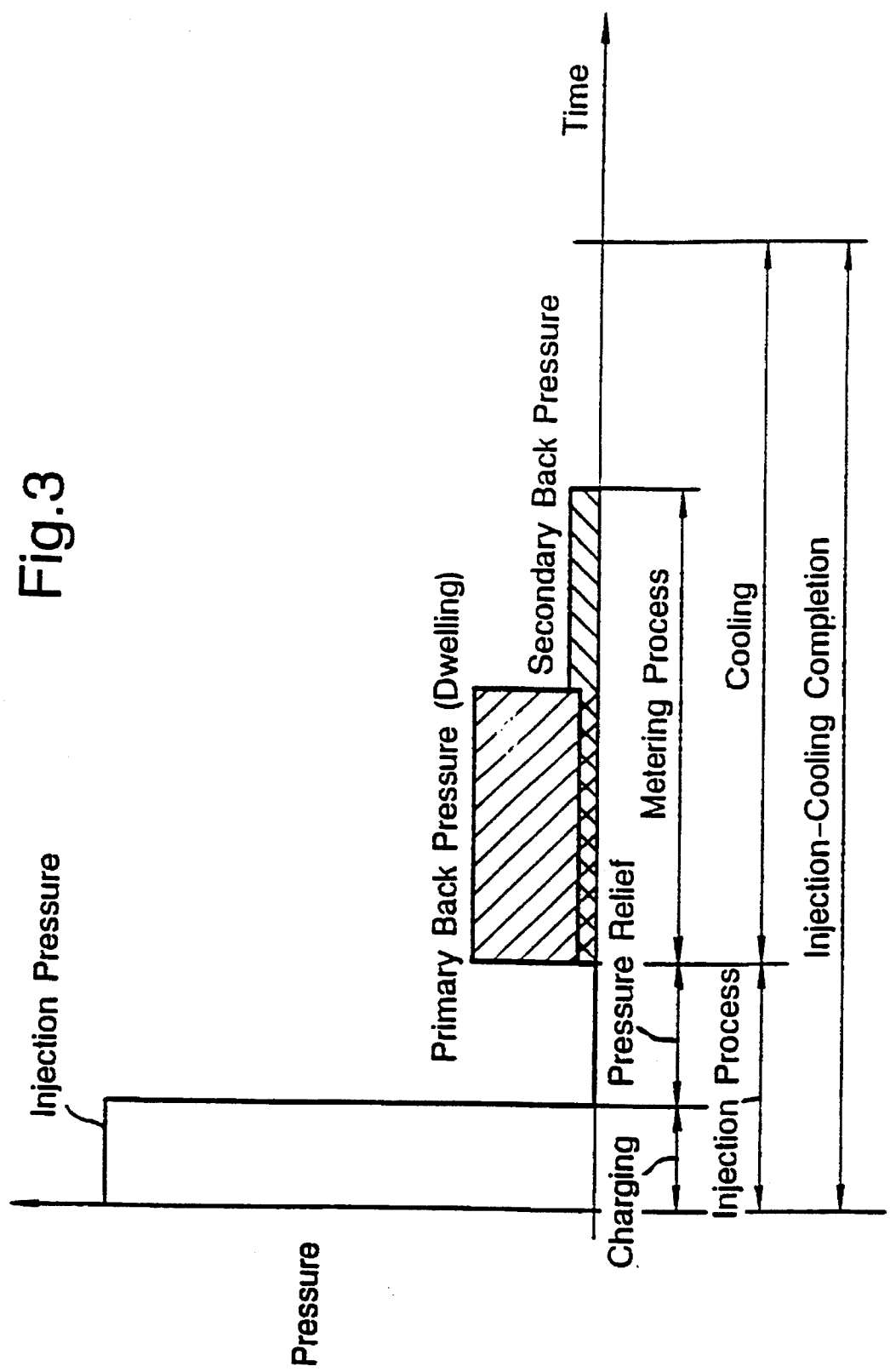

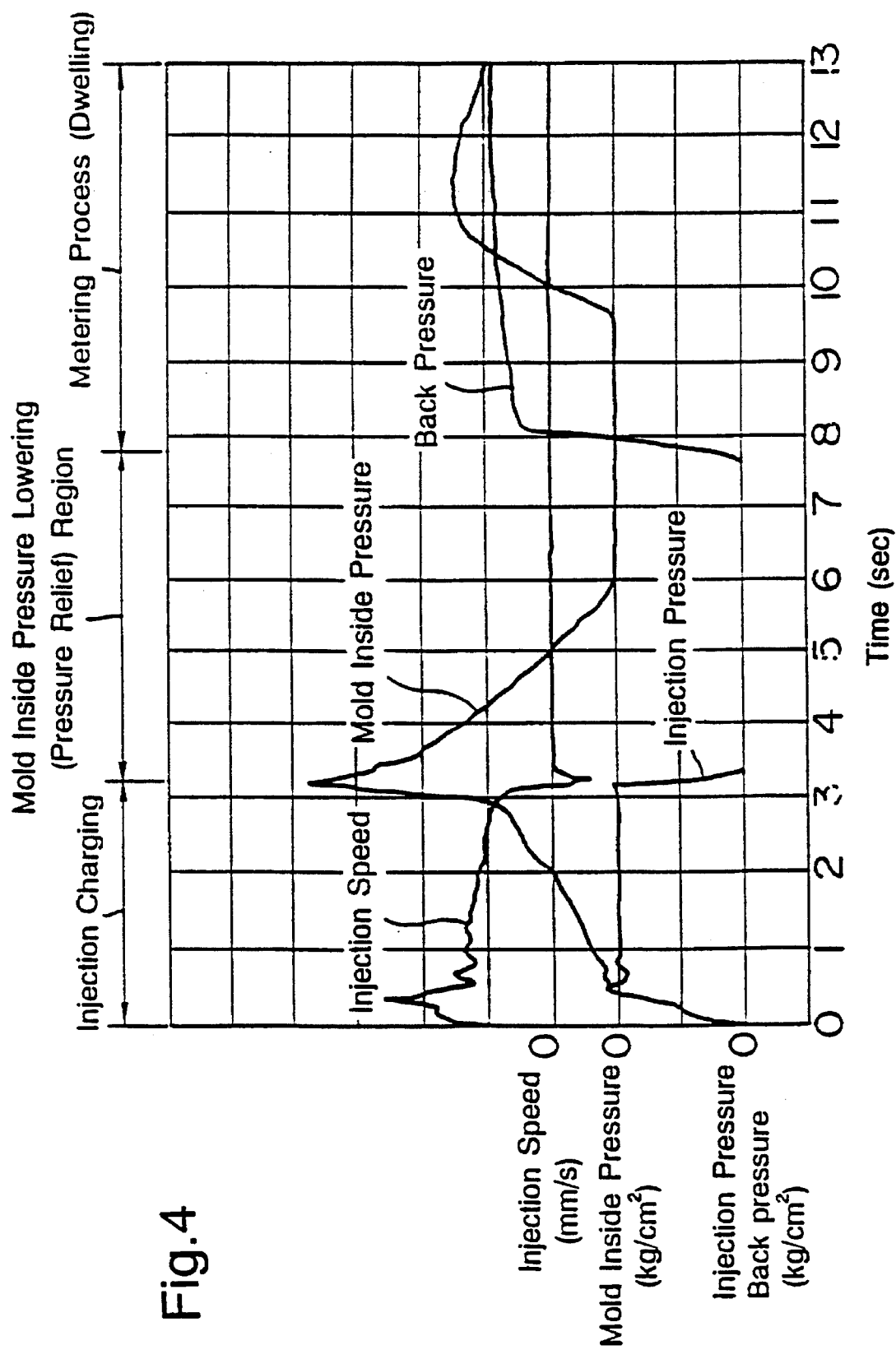

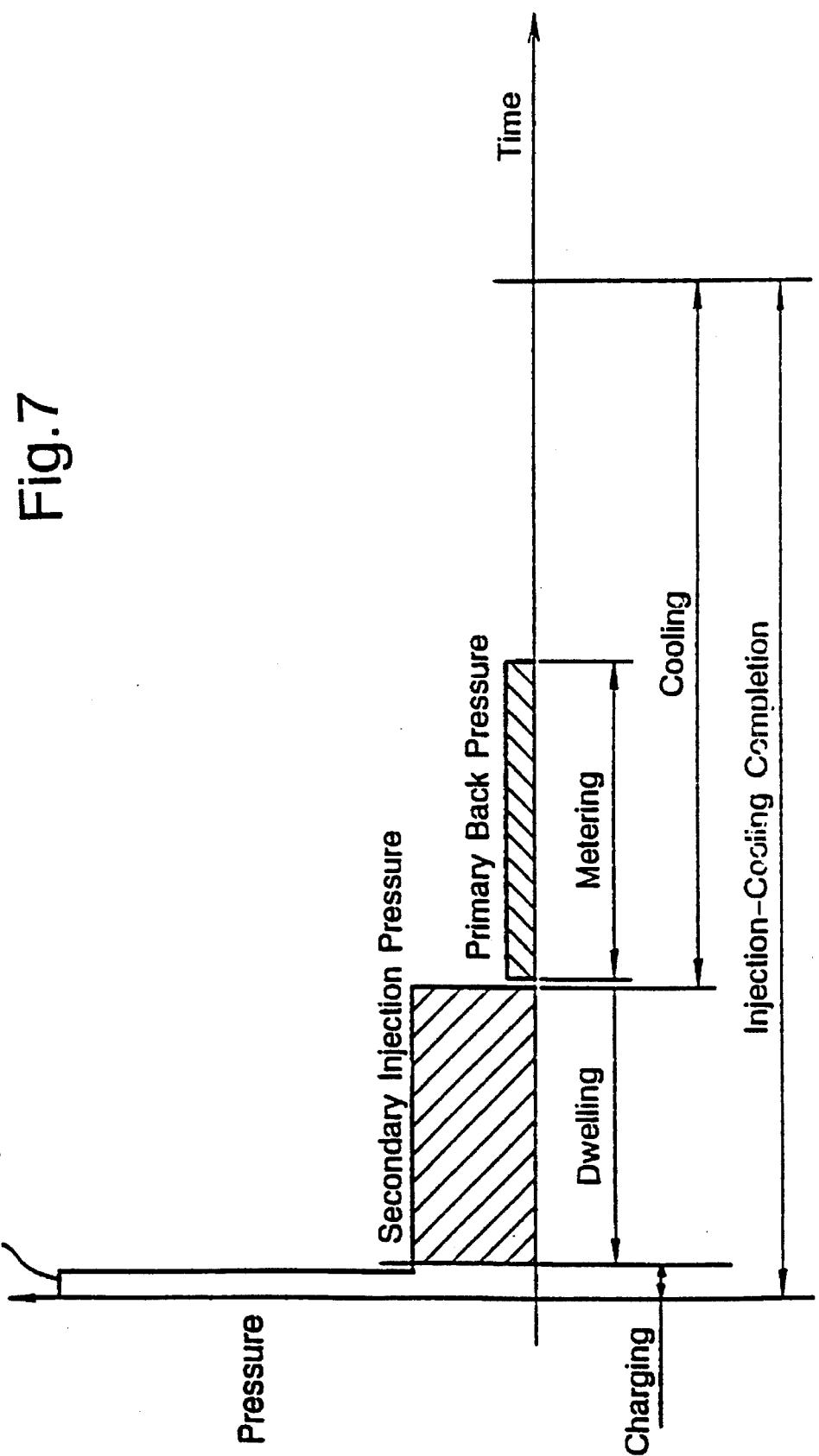

INJECTION MOLDING METHOD

BACKGROUND OF THE INVENTION

1. Field of the Invention

The present invention relates to an injection molding method of metering a molding material of a synthetic resin and then injecting it into a cavity in a mold by the forward movement of a screw in an injection heating cylinder to mold it into a required molded article.

2. Background Art

Conventional injection molding method using common synthetic resin (hereinafter simply called resin) comprises a metering process in which by use of a machine including a screw in its injection heating cylinder, the resin supplied into the injection heating cylinder is made plasticated under a back pressure while rotating the screw and stored in the head portion of the injection heating cylinder by the backward movement of the screw associated with the plastication, and an injecting process in which the metered resin is injection charged into the cavity of the mold by the forward movement of the screw and after the charging is completed, dwelling is performed.

The injecting process, as shown in FIG. 7, comprises a charging process for charging the resin into the cavity by a primary pressure and a dwelling process performed continuously by a secondary pressure, and generally, the charging process is performed under speed control, while the dwelling process is performed under pressure control. This is because an immediate release of a charging pressure causes the resin in a melted state to flow back from a gate, so that the back flow is to be prevented, and when the resin solidifies, it contracts, so that the contraction is to be compensated for.

Accordingly, since the dwelling is not required after the resin solidifies, the dwelling time is set to a time to reach the gate solidification, so that the dwelling time varies with the design dimensions of a molded article, and for a thick-wall molded article whose runner or gate is designed with thick-wall, inevitably the dwelling time is set to a longer value. After the dwelling time has elapsed, the process is shifted to the resin metering.

The back pressure at the metering is a pressure applied by a hydraulic pressure to the screw as a resistance to the backward movement of the screw associated with the forward movement of the resin for metering in a melted state, and a higher back pressure causes the screw backward moving speed to become slow and thus a plastication ability to be reduced, so that the back pressure is usually set to a value lower than the dwelling pressure.

The cavity cooling process is time counted from the dwelling completion, considered to be completed when the set time is reached, and then shifted to the next process such as a cavity opening and molded article taking out. The cooling time, which varies with the wall-thickness and shape of a molded article, is often generally longer than the metering time. However, although some cooling requires a shorter time, an excessive cooling has not particular effect on a molded article, so that in some case, after the cooling is performed to the metering completion, the metering process is shifted to the next process.

The improvement of the molding efficiency in such injection molding depends on how to shorten the molding cycle time, so that if the time required for any of sequential injection molding processes including clamping process and taking out process other than the process relating to injection can be shortened, the molding time would be shortened by the shortened time, thereby increasing the number of moldings. Although an effort such as the achieving of the high speed of each equipment in its own way has been effective to shorten the process time, the shortening of the molding time by improving equipment has a limit, so that current situation is such that the molding cycle shorter than current one cannot be expected.

If immediately after injection charging, the process is shifted to the dwelling so as to shorten time, a warpage, a sink mark and the like may partially occur in a molded article. Although the phenomenon may be prevented to some extent by the shape of a molded article or the design of a cavity gate, for a molded article subject to a limit in shape or gate design, there has been no preventive means.

Thus, in order to eliminate the partial occurrence of a warpage, a sink mark and the like, the present inventors have previously found a molding method comprising the steps of setting an injection pressure when the cavity is filled with a resin to zero value to perform the pressure relief of the resin in the cavity, and thereafter performing dwelling.

However, although the molding method has an advantage in that it can prevent the partial occurrence of a warpage and the like on a molded article without significantly changing molding process, it has a new problem in that a pressure relief time longer than conventional time is required, so that the molding time longer by that time difference is required.

The present invention has been made in view of the above-mentioned circumstances and it is an object of the invention to provide an injection molding method capable of shortening the time required from injection start to metering completion and making earlier the time count start point of cooling time, by integrating the dwelling process with the metering process, and capable of shortening the molding time even for a molding method requiring a pressure relief time in the injection process.

SUMMARY OF THE INVENTION

A first feature of the present invention according to the above-mentioned object exists in that after resin charging is completed, with the screw allowed to rotate, process is shifted to the metering process, and using the back pressure in the metering process as a dwelling pressure, dwelling is performed simultaneously with the resin metering.

Also, with the back pressure required for metering set to a higher value as a primary back pressure, and using the back pressure as a dwelling pressure, dwelling is performed simultaneously with the resin metering, and after the dwelling time has elapsed, with the pressure allowed to lower so as to use as a secondary back pressure, the metering is continued to a set time.

In the above-mentioned method, even when the back pressure is used as a dwelling pressure, the rotation of the screw causes the resin metering to be performed. The back pressure as a dwelling pressure is set to a value higher than a normal back pressure, so that during dwelling, plasticating ability becomes smaller than in a normal case, and thus the metering time becomes somewhat longer, but as a whole, the total cycle time becomes shorter than in a conventional case where metering is started after dwelling.

The cooling time is time counted from a time when charging is completed or metering is started, so that the time count starting point becomes earlier than in a case where time count is started at a time when dwelling is completed, and thus the time count is completed early by that time made earlier, thereby shortening molding time by that time.

Accordingly, the time is shortened in a case either where metering completion is taken as molding process completion, or where cooling completion is taken as molding process completion, so that molding cycle time can be shortened by the reduced time, with the result that molding efficiency is much more improved than conventional method.

The shortening of molding time can be performed only by integrating dwelling process with metering process and making earlier the time count start point of cooling time, without the necessity of a special equipment or a complex molding operation, so that it has an advantage of being economy and the like.

A second feature of the present invention exists in that with an injection pressure at a time when the cavity is filled with a resin set to zero value, the pressure relief of a material in the cavity is performed for a required time, and then with the screw allowed to rotate, process is shifted to the metering process, and using the back pressure in the metering process as a dwelling pressure, dwelling is performed simultaneously with the resin metering.

The set time of the zero value of the above-mentioned injection pressure is within a range 0.1 to 10 seconds, and the range of the time is set with consideration to the shape and wall thickness distribution of a molded article, gate design, cavity capacity and the like, and the dwelling is performed by controlling the back pressure in a plurality of steps.

In the above-mentioned method, before dwelling is started by setting injection pressure to zero value, or for an initial period of dwelling, the energy in the cavity is once removed and the cooling of a previously-charged downstream portion is promoted, whereby the fluidizable region of the resin in the cavity becomes narrow.

For the dwelling in such state, the resin in the fluidizable region solidifies under a specified pressure, and at that point, the solidification requires less energy than in a case where solidification is performed by the dwelling in a wide fluidizable region state, so that the energy in a molded article becomes balanced as a whole, whereby a warpage or a sink mark becomes hard to occur.

Even when the back pressure acts as a dwelling pressure by integrating dwelling process with metering process, the rotation of the screw causes the resin metering to be performed. The back pressure as a dwelling pressure is set to a value higher than a normal back pressure, so that during dwelling, plasticating ability becomes smaller than in a normal case, and thus the metering time becomes somewhat longer, but as a whole, the metering time becomes shorter than in a case where metering is started after dwelling.

The cooling can be started simultaneously with the start of metering, so that the time count starting point becomes earlier than in a case where time count is started at a time when dwelling is completed, and thus time count is completed early by the time made earlier. Accordingly, the pressure relief time is offset by the reduced time achieved by integrating dwelling process with metering process, and the time count of cooling time is also made earlier, so that the time is shortened in a case either where metering completion is taken as molding process completion, or where cooling completion is taken as molding process completion.

BRIEF DESCRIPTION OF THE DRAWINGS

FIG. 2 is a comparison diagram of shortened time by a conventional injection molding method shown in the first embodiment and FIG. 7.

FIG. 3 is an illustrative diagram of the process of a second embodiment in an injection molding method of the present invention.

FIG. 4 is a waveform data graph drawing the action state of a molding machine by the second embodiment.

FIG. 7 is an illustrative diagram of the conventional injection molding method.

DETAILED DESCRIPTION OF THE PREFERRED EMBODIMENTS

Figure 1:
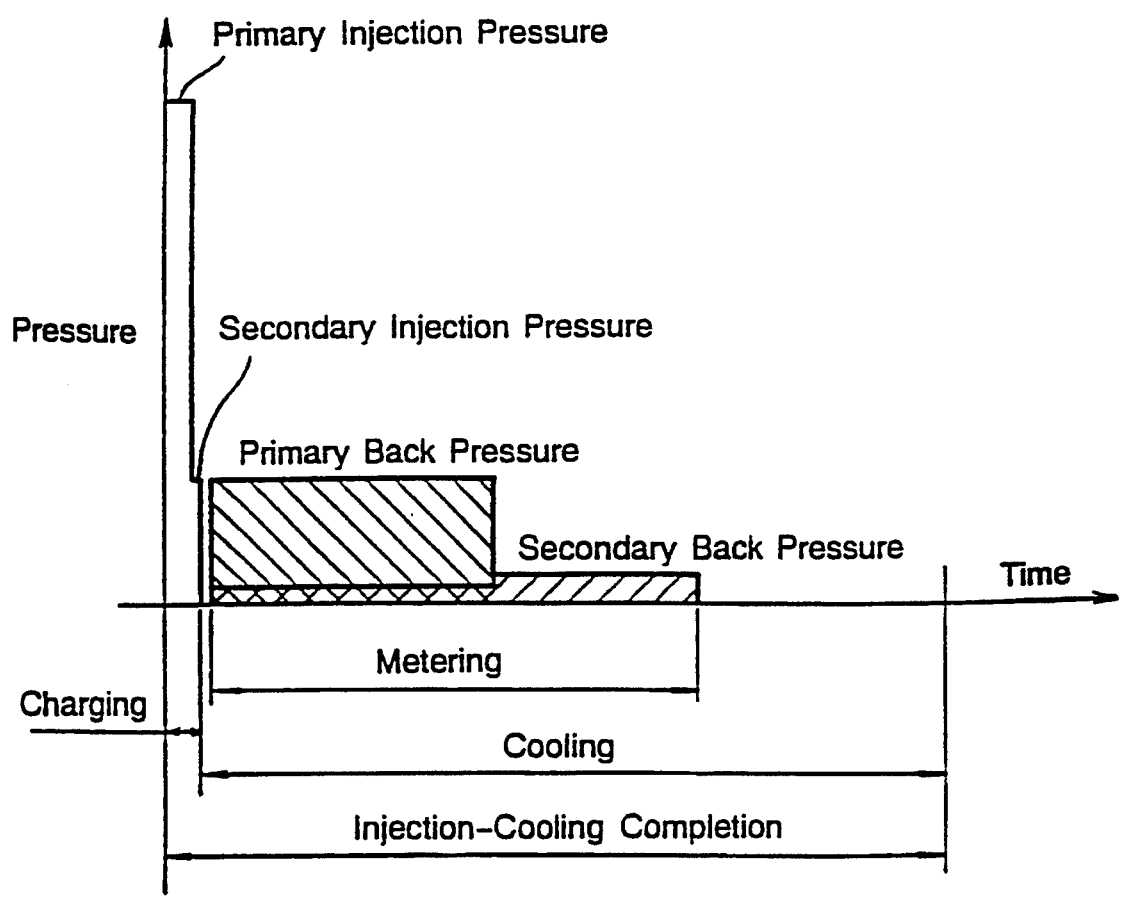
FIG. 1 is an illustrative diagram of the process of a first embodiment in an injection molding method of the present invention.

FIG. 1 is an illustrative diagram of a first invention in which with the dwelling after injection charging omitted, the metering of a resin is immediately started, and in a first embodiment shown here, first a resin metered by a primary injection pressure is injection charged, and the pressure is lowered to a secondary injection pressure to complete the charging of the resin in a cavity (view is omitted). some time (0.1 second) left elapsed, the time count of cooling time is started. When a screw in an injection cylinder is rotated simultaneously with the time count start, the rotation causes a pellet-like resin supplied from a rear hopper into the injection cylinder to be melted sequentially, plasticated and fed to the front of the screw, whereby metering is started.

Then, with the back pressure required for the metering set to a higher value as a primary back pressure, and using the back pressure as a dwelling pressure, dwelling is performed simultaneously with the resin metering. After the dwelling time has elapsed, with the pressure allowed to lower so as to use as a secondary back pressure, the metering is continued to a set time. The time count start of cooling time may be performed simultaneously with the start of metering.

The following table shows a comparison in set conditions between the first embodiment and a conventional method.

|  | Conventional method | First embodiment |
|---|---|---|
| Injection charging time (sec) | 0.40 | 0.40 |
| Dwelling time (sec) | 3.30 | — |
| Metering time (sec) | 3.63 | 5.37 |
| Primary injection pressure (kg/cm$^2$) | 1180 | 1180 |
| Secondary injection pressure (kg/cm$^2$) | 300 | 300 |
| Dwelling pressure (kg/cm$^2$) | 300 | — |
| Primary back pressure (kg/cm$^2$) | 75 | 300 |
| Secondary back pressure (kg/cm$^2$) | — | 75 |
| Screw diameter (mm) | 63 | 63 |
| Revolution speed (rpm) | 152 | 152 |
| Rotation pressure (kg/cm$^2$) | 68 | 68 |
| Injection stroke (mm) | 56.97 | 56.97 |

Product weight: 13.6 g × 8 pieces
Runner weight: 21.41 g
Resin: Polyethylene
Molding machine used: FS360S100A6E (manufactured by Nissei Plastic Industrial Co., Ltd.)

FIG. 2 is a diagram showing a comparison between the first embodiment and a conventional method, and shows a general time difference where the molding under the set conditions for the conventional method listed in the above table is performed by the present invention. In the comparative diagram, the first embodiment requires a longer metering time by 1.74 seconds than the conventional method. This is because the back pressure is set to 300 kg/cm² for dwelling, and inevitably the metering time becomes longer by a reduced portion of plasticating ability due to such setting. However, comparing with the time from the dwelling process of the conventional method, on the contrary, the time is shortened by 1.56 seconds.

Although the cooling time is the same for the both, due to a difference in metering starting point, the present invention is completed earlier by about 3.3 seconds (by a time made earlier).

Accordingly, with the first embodiment, where with the metering completion point taken as a molding process completion, process is shifted to a mold opening process, the molding time is shortened by 1.56 seconds, and where with the cooling completion point taken as a molding process completion, process is shifted to a mold opening process, the molding time is shortened by 3.3 seconds.

Figure 5A:
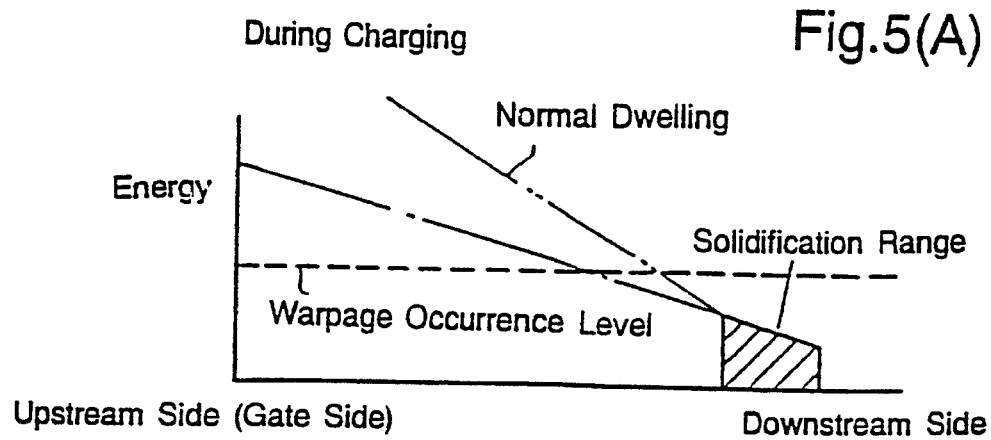
FIGS. 5 (A) to 5 (C) are illustrative diagrams showing an energy state for a resin in the cavity by the second embodiment.
Figure 5B:
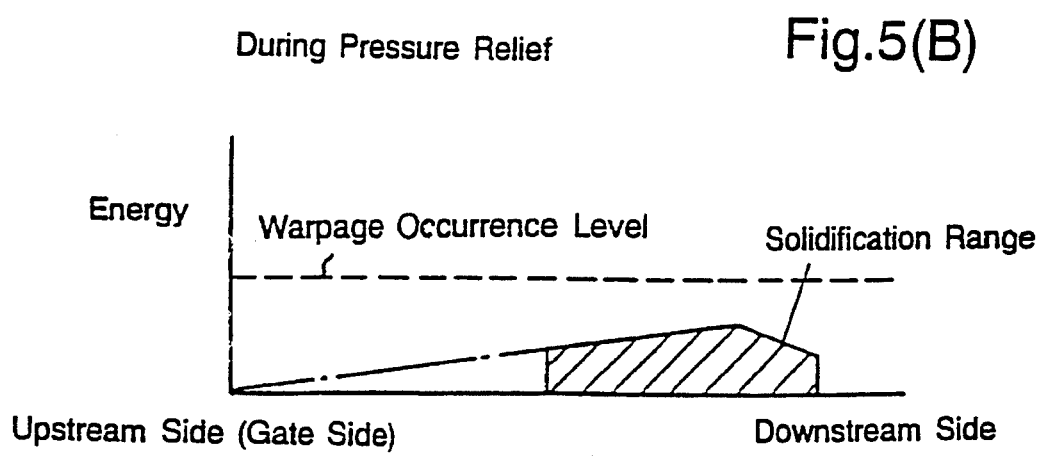
Figure 5C:
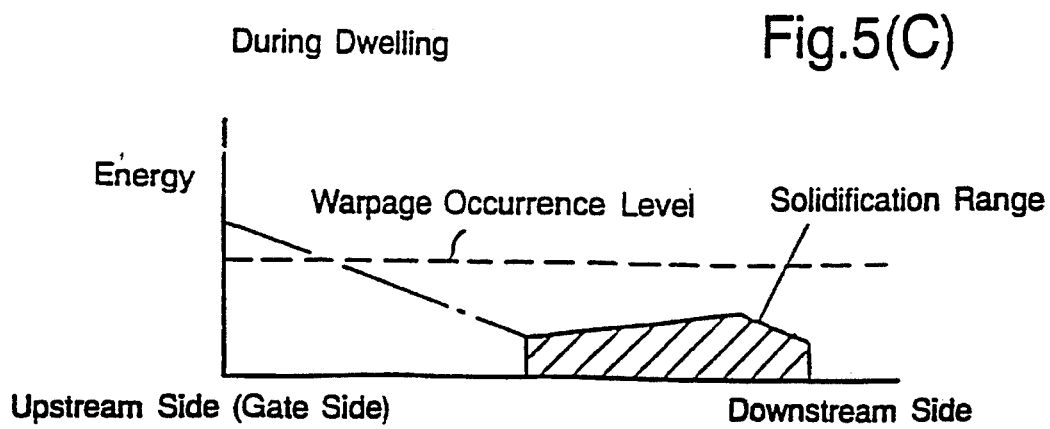
Figure 6:
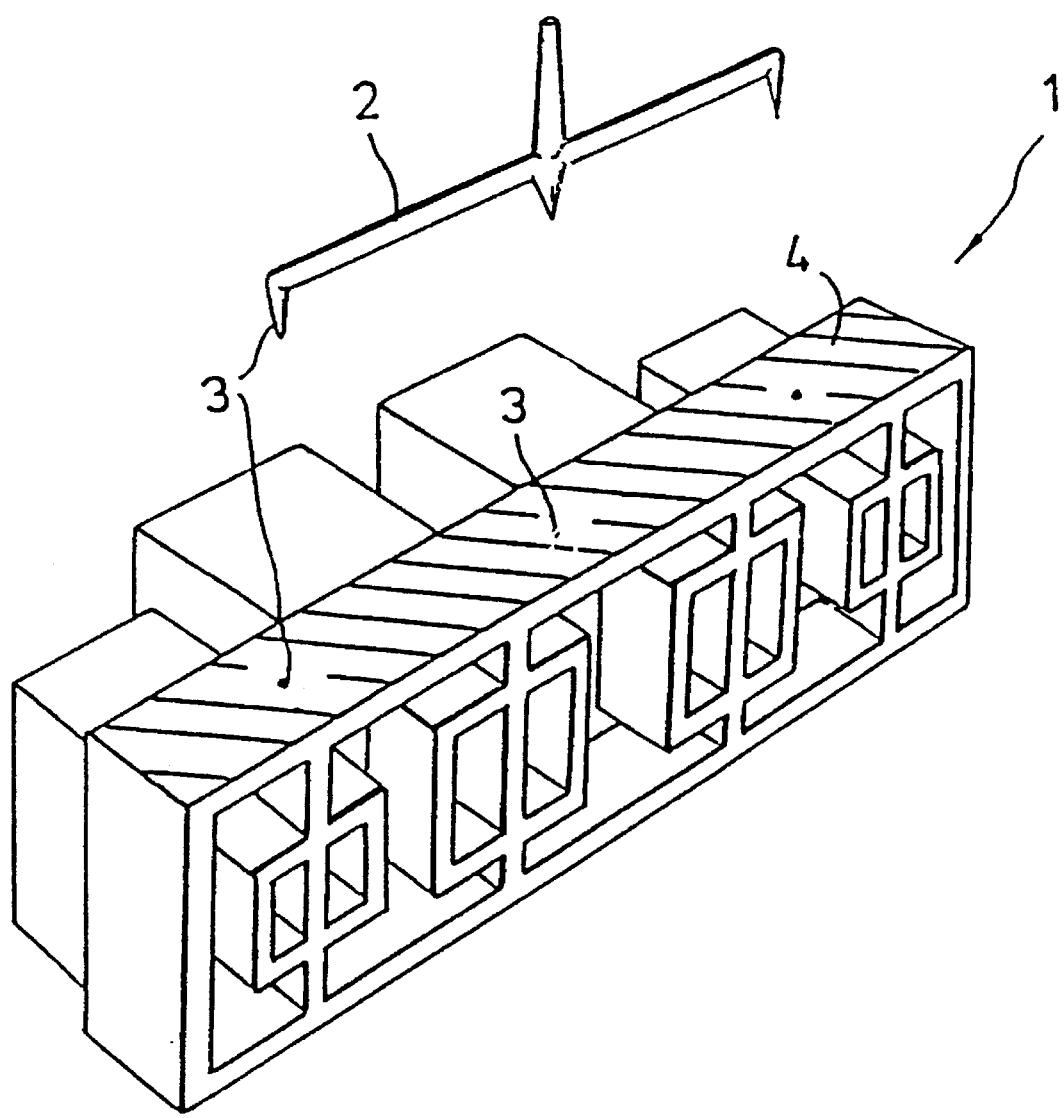
FIG. 6 is a perspective view of a molded article in which warpage occurring portion is shown with oblique line and of a runner by a conventional injection molding method.

FIGS. 3 through 6 show a second invention performing pressure relief after charging completion as a second embodiment, and the injection molding of a molded article with a shape (box-type connector) shown in FIG. 6 is given as an example.

The injection molding is performed in such a manner that process is shifted immediately from charging process to dwelling process, or that process is shifted in the order of charging process, then compression process, followed by dwelling process. However, the compression process is included in the dwelling process as part of the dwelling process, so that both processes will be explained as the dwelling process. The set conditions other than those relating to pressure relief are as with the above-mentioned first embodiment.

If the above-mentioned molded article 1 is molded by a conventional injection molding method shown in FIG. 8, a warpage would occur on the position shown with oblique line. This portion is a thin-wall side plate portion 4 molded on cavity gate sides 4, 4 branched from a runner 2, which has been considered to be difficult to remove.

Also, in this second embodiment, with the above-mentioned side plate portion 4 taken as the gate side, the injection of a resin is performed. FIG. 4 is a waveform data graph drawing the action state of a molding machine during actual molding of this embodiment with respect to time axis using the molding start as a drawing starting point, and shows a state of injection speed, injection pressure, mold inside pressure and back pressure corresponding to respective processes.

First, the injection charging of a resin by speed control is started (see FIG. 3). The cavity is filled with the resin in association with the injection charging, and thus the mold inside pressure increases and 3.3 seconds later, reaches a peak as shown in FIG. 4. In the cavity, as shown in FIG. 5 (A), the resin of fluidized front (on the downstream side) is solidifying, and the other resin except that in contact with cavity surface is in a fuidizable state, so that the energy in the cavity becomes larger on the upstream side at which a gate is positioned than on the downstream side.

If with the point in such state taken as a charging completion, process is immediately shifted to dwelling, the resin with its energy balance kept would solidify to the upstream side, and the energy become a value largely exceeding a warpage occurrence level, so that a warpage would be apt to occur on a molded article. Where the molded article 1 is a box-type connector with a shape shown in FIG. 6, a warpage occurs on the portion shown with oblique line. This portion is the thin-wall side plate portion 4 molded on the cavity gate sides 4, 4 branched from the runner 2.

However, in this second embodiment, the injection pressure is previously set such that at a time when the mold inside pressure reaches a peak, the injection pressure becomes zero, and thereafter the injection pressure does not act on the resin in the cavity, so that the mold inside pressure lowers to zero value in a little less than 3 seconds. When such state is kept in about 3.3 seconds, during that time the mold inside pressure becomes uniform, and as shown in FIG. 5 (B), the energy in the fluidizable region is removed such that it becomes smaller than the warpage occurrence level and the solidification on the downstream side is also promoted, whereby the fluidizable region is further narrowed.

Then, with the elapse of the above-mentioned time taken as an injection process completion, the screw is allowed to rotate and process is shifted to the resin metering process. In the metering process, as shown in FIG. 3, the back pressure is set to a higher value as a primary back pressure, and using the back pressure as a dwelling pressure, dwelling is performed simultaneously with the resin metering. After the dwelling time has elapsed, with the pressure allowed to lower so as to use as a secondary back pressure, the metering is continued to a set time. The time count start of cooling time is performed simultaneously with the start of metering.

The mold inside pressure rises following the rise of the dwelling pressure with a delay of about 1.5 seconds. In this dwelling, the energy is given only to the narrowed fluidizable region, so that even when the energy becomes larger than the warpage occurrence level, the exceeding energy becomes a very little region on the whole as shown in FIG. 5 (C).

Accordingly, the dwelling requires less energy than in a case where solidification is performed by dwelling in a wide fluidizable region state, so that the energy in a molded article becomes balanced as a whole, whereby a warpage or a sink mark becomes hard to occur. In the above-mentioned box-type connector 1, an analysis reveals that together with the achieving of strain prevention by the low-pressure injection, a well-controlled pressure distribution becomes significant, and with respect to shear stress, volume shrinkage factor and the like, even when the final values of volume holding factor are the same, the shear stress is small, so that little warpage is found. The time required for dwelling and metering and further for cooling completion becomes shorter than the conventional method in which after dwelling process completion, the process is shifted to metering process.

Although with respect to metering time, the metering, as with the first embodiment, requires a longer time than the conventional method, that is because the back pressure is set to a higher value for dwelling, so that inevitably the metering time becomes longer by the reduced portion of plasticating ability due to such setting. However, comparing with the time from the dwelling process of the conventional method, on the contrary, the time is shortened as with the case shown in FIG. 2, and although the cooling time of both methods are the same, the difference in metering starting point causes the present invention to be completed earlier by a time made earlier.

Accordingly, where with the metering completion point taken as a molding process completion, the molding process is shifted to a mold opening process, the molding time is shortened, and where with the cooling completion point taken as a molding process completion, the molding process is shifted to a mold opening process, the molding time is also shortened. As a result, even when pressure relief requires a time, the time can be offset, so that the molding process requires a shorter time than in a case where pressure relief process is employed in the conventional method shown in FIG. 7.

What is claimed is:

1. An injection molding method comprising a metering process in which with a screw for injection provided in an injection heating cylinder, a resin supplied into the injection heating cylinder is made plasticated under a back pressure while rotating the screw and stored in a head portion of the injection heating cylinder by the backward movement of the screw associated with the plastication, and an injecting process in which the metered resin is injection charged into a cavity of a mold by the forward movement of the screw and after the charging is completed, dwelling is performed, characterized in that:

after the charging of said resin is completed, with the screw allowed to rotate, process is shifted to the metering process, and using the back pressure in the metering process as a dwelling pressure, dwelling is performed simultaneously with the resin metering.

2. An injection molding method as set forth in claim 1, wherein with the back pressure required for metering set to a higher value as a primary back pressure, and using the back pressure as a dwelling pressure, dwelling is performed simultaneously with the resin metering, and after the dwelling time has elapsed, with the pressure allowed to lower so as to use as a secondary back pressure, the metering is continued to a set time.

3. An injection molding method as set forth in claim 1, characterized in that a time count of the cooling time is performed from a time when charging is completed or metering is started.

4. An injection molding method comprising a metering process in which with a screw for injection provided in an injection heating cylinder, a resin supplied into the injection heating cylinder is made plasticated under a back pressure while rotating the screw and stored in the head portion of the injection heating cylinder by the backward movement of the screw associated with the plastication, and an injecting process in which the metered resin is charged into the cavity of a mold by the forward movement of the screw and after the charging is completed, dwelling is performed, characterized in that:

with an injection pressure at a time when the cavity is filled with a resin set to zero value, the pressure relief of a material in the cavity is performed for a required time, and then with the screw allowed to rotate, process is shifted to the metering process, and using the back pressure in the metering process as a dwelling pressure, dwelling is performed simultaneously with the resin metering.

5. An injection molding method as set forth in claim 4, characterized in that the set time of the zero value of the injection pressure is within a range 0.1 to 10 seconds, and the range of the time is set with consideration to the shape and wall thickness distribution of a molded article, gate design, cavity capacity and the like, and that the dwelling is performed by controlling the back pressure in a plurality of steps.

* * * * *